United States Patent [19]

Stauffer

[11] 4,377,330
[45] Mar. 22, 1983

[54] LOW COST AUTO FOCUS SYSTEM IMPROVEMENT

[75] Inventor: Norman L. Stauffer, Englewood, Colo.

[73] Assignee: Honeywell Inc., Minneapolis, Minn.

[21] Appl. No.: 307,412

[22] Filed: Aug. 18, 1981

[51] Int. Cl.³ .................. G03B 13/00; G03B 9/08; G03B 9/22

[52] U.S. Cl. ............................. 354/25; 354/226; 354/233; 354/264

[58] Field of Search ............ 354/25 R, 25 A, 25 N, 354/25 P, 31 F, 152, 228, 233, 195, 264, 226, 230; 355/56; 352/140

[56] References Cited

U.S. PATENT DOCUMENTS

| | | | |
|---|---|---|---|
| 3,713,371 | 1/1973 | Kurihara et al. | 354/25 N |
| 4,309,603 | 1/1982 | Stauffer | 354/25 X |

OTHER PUBLICATIONS

U.S. appln. Ser. No. 213,438, filed Dec. 5, 1980 in the name of Norman L. Stauffer entitled Detector Balance Apparatus and Method.

*Primary Examiner*—William B. Perkey
*Attorney, Agent, or Firm*—Charles J. Ungemach

[57] ABSTRACT

A mechanism for use in a camera employing a low cost auto focus system wherein the light from the remote scene is reflected from a moveable mirror to the auto focus circuitry to produce an output indicative of the correct focus position and thereafter the shutter mechanism of the camera is moved into position behind the taking lens and the mirror is moved out of position to allow the shutter to thereafter control the travel of light from the taking lens to the film.

14 Claims, 3 Drawing Figures

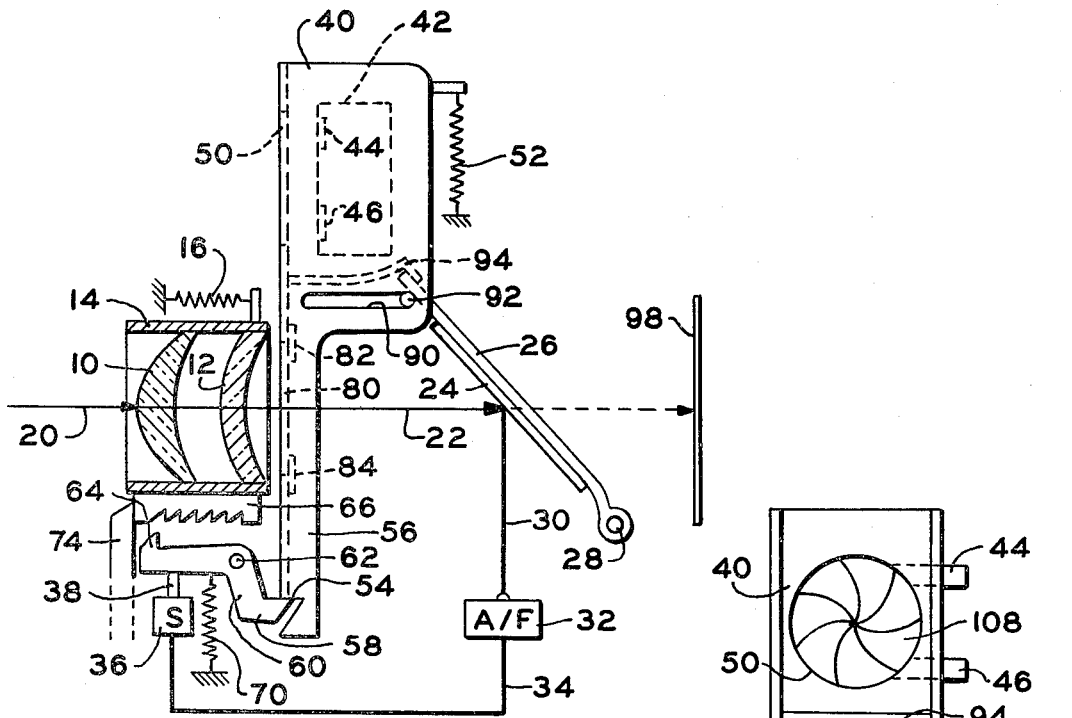
FIG. 1
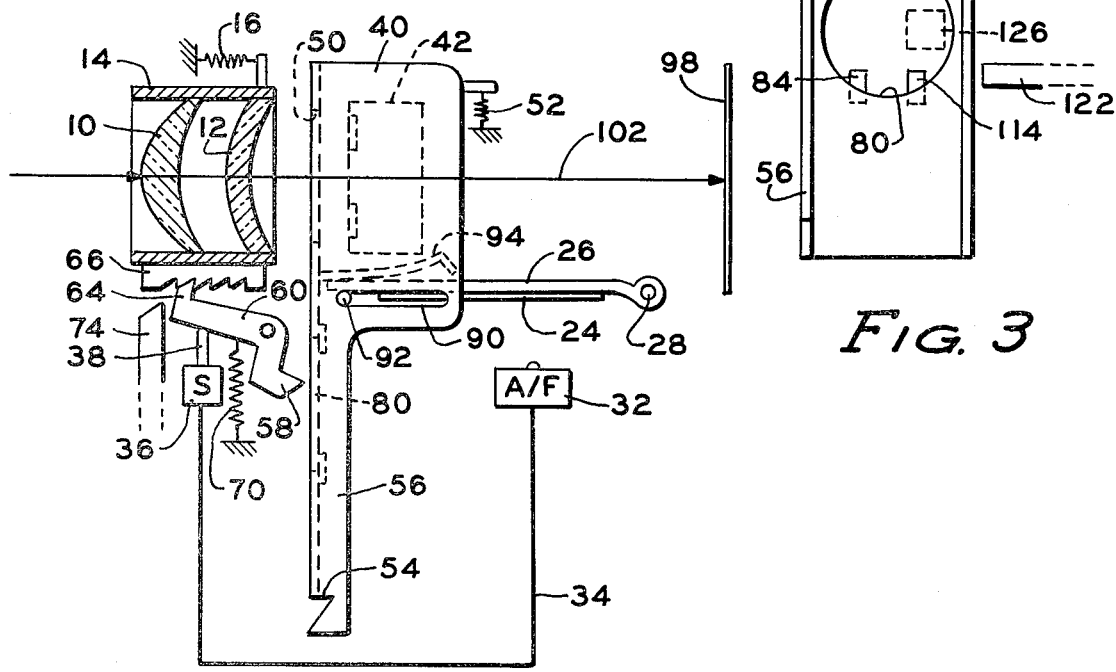
FIG. 2
FIG. 3

1

LOW COST AUTO FOCUS SYSTEM IMPROVEMENT

BACKGROUND OF THE INVENTION

In a copending application Ser. No. 85,821, filed Oct. 17, 1979 in the name of Norman L. Stauffer (now U.S. Pat. No. 4,309,063 issued Jan. 5, 1982), a low cost auto focus system was disclosed useful primarily on less expensive cameras; i.e., those with "between-the-lens" shutters. In that copending application, an additional lens, referred to as the focus lens, is utilized to produce the auto focus signal necessary for adjusting the position of the taking lens of the camera at the desired focus position. The focus lens is mechanically connected to the taking lens and moves along a parallel axis therewith and when the focus lens is at the proper focus position, as determined by the auto focus circuitry, the lens moving structure stops both the taking lens and the focus lens while the film is being exposed.

In a copending application Ser. No. 213,438 filed Dec. 5, 1980 in the name of Norman L. Stauffer, now U.S. Pat. No. 4,359,636, an improvement to this system is shown wherein moveable masking means are used to block a small portion of the radiation through the focus lens so as to assure that the detectors receiving the radiation have outputs which are as closely matched as possible to produce optimum focus results.

While the apparatus of the above-referred to copending applications operates to produce satisfactory results, it has been found difficult to make a small slave or focus lens system and still retain the focus performance required. For one thing, the size requirements dictate that a relatively small lens be used as a focus lens and thus the accuracy is not as great as would be desirable. Furthermore, the linkage required to couple the taking lens to the focus lens requires accurate adjustment and requires the use of linkage mechanisms which it would be desirable to eliminate.

SUMMARY OF THE INVENTION

The apparatus of the present invention permits the use of the taking lens itself to provide the light path for the auto focus circuitry and thus eliminates the need for an additional focus lens. More particularly, the present invention can be used in a low cost camera having a "between-the-lens" shutter mechanism commonly found in low cost cameras by providing a means for moving the shutter mechanism into and out of the space behind the lens. When the shutter is out of its position behind the lens, light passing through the taking lens is utilized by the auto focus circuitry to position the lens at the proper focus position after which time the shutter mechanism is moved into position behind the lens so that the operation of the shutter may thereafter properly expose the film.

BRIEF DESCRIPTION OF THE DRAWINGS

FIG. 1 shows a schematic view of the present invention wherein the shutter mechanism is out of position behind the lens;

FIG. 2 shows the apparatus of FIG. 1 wherein the shutter mechanism is in position behind the lens; and FIG. 3 shows a back view of the carrier structure housing the shutter mechanism of the camera.

DETAILED DESCRIPTION OF THE PREFERRED EMBODIMENT

In FIG. 1, the taking lens of a camera is shown comprising a pair of lenses 10 and 12 mounted in a cylindrical housing member 14 which is moveable to the left in FIG. 1 under the action of a spring 16. The lens housing 14 is positioned to the right or to the "beyond-infinity" position under the action of a mechanism not shown operated in conjunction with the film advance mechanism.

Radiation from the scene being viewed travels to the lens 10 along a path shown by arrow 20 and through lenses 10 and 12 along a path shown by arrow 22 to the surface of a mirror 24 mounted on a moveable member 26 which is pivoted about an axis 28. In the position shown in FIG. 1, radiation is reflected by mirror 24 along a path shown by arrow 30 to an auto focus circuit 32 shown as a box with the letters "A/F" therein. The auto focus circuitry in box 32 may be like that discussed in the above-mentioned copending application Ser. No. 85,821 and operates to produce an output on a conductor 34 which is connected to a solenoid 36. When the auto focus circuitry 32 senses the proper auto focus position has been reached, the signal to solenoid 36 will cause its plunger 38 to move upwardly in FIG. 1 to position the lens housing 14 as will be hereinafter described.

Located adjacent the right end of lens housing 14 is a shutter housing 40 containing a shutter mechanism 42 in the upper part thereof which shutter mechanism is operable to open and close under the action of signals presented to it via shutter actuator members 44 and 46. Carrier 40 contains a first aperture at 50 through which radiation may pass to the shutter mechanism 42. In the position shown in FIG. 1, however, the shutter mechanism is not behind lenses 10 and 12 and thus does not perform any function. Shutter carrier 40 is urged downwardly under the action of a spring 52 but is held in the position shown in FIG. 1 by the coaction between an abutment 54 placed in a downwardly extending portion 56 of carrier 40 and a catch 58 connected at one end of a rotating member or release arm 60 which is rotatable about an axis 62. At the other end of release arm 60 is a catch 64 which is operable to cooperate with a perforated member 66 attached to the housing 14. Release arm 60 is biased to rotate in a counterclockwise direction around axis 62 by a spring 70 and at its left end bears against the plunger 38 of solenoid 36. It can be seen that upon actuation of solenoid 36, plunger 38 will move upwardly causing release arm 60 to move in a clockwise direction around axis 62 and bring catch 64 into contact with one of the perforations in member 66 and at the same time will move catch 58 out of contact with abutment 54 of carrier 40 thus allowing carrier 40 to move downwardly under the action of spring 52.

It is seen in FIG. 1 that housing 14 is held in position by a catch 74 bearing against the left end of member 66 and, as shown in FIG. 1, housing 14 is not capable of moving to the left under the action of spring 16. Member 74 is moveable in a downward direction under the action of a connection not shown to the operation button of the camera and is moved back into the position shown in FIG. 1 by the film advance mechanism also not shown.

The downwardly extending arm 56 of carrier 40 has a second aperture 80 which, in FIG. 1, allows light to pass through from lenses 10 and 12 to the mirror 24.

Aperture 80 has tabs, such as 82 and 84, better seen in FIG. 3, which are moveable into and out of the aperture so as to provide for detector balance in accordance with the teachings of the above-mentioned copending application Ser. No. 213,438.

Carrier 40 has a slot 90 cut in the lower portion thereof so as to cooperate with a pin 92 attached to the upper end of member 26 carrying mirror 24. A light shield 94 is shown extending interiorly of carrier 40 from the left wall below aperture 50 and above aperture 80 over to and bending around the upper portion of moveable member 26 so as to prevent light from passing through lenses 10 and 12 and around member 26 to reach the film shown in FIG. 1 at 98.

It is seen that in the position shown in FIG. 1, radiation passes through lenses 10 and 12 to mirror 24 and is reflected down to the auto focus circuitry 32 so as to produce an auto focus signal on conductor 34 operable to activate solenoid 36. The procedure starts with the camera operator releasing the activation button at which time member 74 moves downwardly out of contact with the left end of member 66 and thus allows lenses 10 and 12 in housing 14 to begin motion to the left under the action of spring 16. As this occurs, the radiation from the scene travelling through lenses 10 and 12 and being reflected off of mirror 24 affects the auto focus circuitry 32 and permits it to provide a signal on conductor 34 at the moment the correct focus position has been reached. At this time, solenoid 36 activates and plunger 38 pushes release arm 60 counterclockwise around axis 62 and into contact with one of the perforations on member 66 thus stopping the lenses at the correct focus position. The rotation of arm 60 is accompanied by a disengagement of catch 58 from the abutment 54 and thus allows carrier 40 to begin moving downwardly in FIG. 1.

As carrier 40 moves downwardly, pin 92 in slot 90 will begin moving towards the left thus causing member 26 carrying mirror 24 to rotate in a counterclockwise direction around axis 28. The top end of member 26 remains in contact with the light shield 94 thus continuing to prevent light from reaching film 98. This downward motion of carrier 40 continues until the shutter mechanism 42 has been moved into position behind lenses 10 and 12 which position is shown in FIG. 2.

In FIG. 2, the same reference numerals have been used to describe the same elements as in FIG. 1 and it can be seen in FIG. 2 that the lens housing 14 has moved slightly to the left under the action of spring 16 and has been stopped by release arm 60 with catch 64 in the second perforation of member 66.

It can also been seen that the shutter mechanism 42 is now in position directly behind the lenses 10 and 12 so that upon opening of the shutter, radiation may travel from lenses 10 and 12 and through the shutter in a direction shown by arrow 102 to the film 98. It is also seen that the member 26, carrying mirror 24, is now in a substantially horizontal position out of the way of radiation travelling along path 102 with pin 92 at the left end of slot 90 and that the light shield 94 still bears upon the surface of member 26. The aperture 80 has now moved down and out of the way of the light path through lenses 10 and 12 and performs no function in this position. No radiation reaches the auto focus circuitry 32 and the output on conductor 34 continues to hold solenoid 36 in an active position thus keeping plunger 38 in its upward position and holding the release arm in the position shown and the housing 14 at the proper focus position. The structure is held in the position shown in FIG. 2 until the picture has been taken.

After the shutter mechanism 42 has been actuated and the film 98 exposed, the power to the auto focus circuit 32 is shut off. This may be accomplished by a circuit (not shown) connected to the shutter mechanism and operable upon shutter operation to actuate a switch to terminate power to the auto focus circuit 32. When power is removed from the auto focus circuit 32, the signal on line 34 disappears and solenoid 36 is deactivated. Lens housing 14 may then move to the left to its near position, or, if desired, the friction between catch 64 and the perforation of member 66 may be designed to hold housing 14 in its FIG. 2 position.

At some future time, the operator will move the film advance mechanism at which time the lens housing 14 is pushed to the right with member 74 moving up to the position shown in FIG. 1 and holding the lenses at the "beyond-infinity" position of FIG. 1 for the next picture taking sequence. The film advance mechanism also pushes carrier 40 upwardly against the action of spring 52 until the catch 58, on the release arm 60, again moves into the area of abutment 54 to hold the carrier 40 in the position shown in FIG. 1. As carrier 40 moves upwardly, the cooperation between pin 92 and slot 90 causes member 26 to rotate clockwise about axis 28 so that mirror 24 again moves into the position shown in FIG. 1 where light through lenses 10 and 12 may be reflected downwardly to the auto focus circuitry 32.

FIG. 3 shows a back view of the carrier 40 and it is seen that the shutter mechanism 108 is in the central upward portion of carrier 40 and has actuating tabs 44 and 46 extending therefrom to the right in FIG. 3. In the lower portion of carrier 40 on downwardly extending member 56, the aperture 80 is shown with tabs 82, 84, 112 and 114 extending therein. The purpose of tabs 82, 84, 112 and 114 are to provide a calibration technique for the detectors as is described in the above-mentioned copending application Ser. No. 213,438. In FIG. 3, at the right hand side adjacent aperture 80, are shown a pair of actuators 120 and 122. As the carrier 40 moves downwardly, as is described above, the actuating members 44 and 46 will move into contact with actuators 120 and 122 so as to provide a means for actuating the shutter mechanism 108 when desired. As an alternate embodiment, a switch could be provided which was actuated by member 40 as it arrived at its downward position in FIG. 2 thus automatically actuating the shutter mechanism 108. The momentum of carrier 40 may be sufficient to mechanically cause the operation of shutter 108 by coming into contact with a shutter control linkage at the remote end of its travel downward.

As an optional feature, a view finder mirror 126 may be mounted in the aperture 80 so as to provide a way for reflecting light into a view finder system similar to that found in many movie cameras.

It is therefore seen that I have provided a simple mechanism operable in conjunction with a low cost camera to provide for a light path to the auto focus circuitry when a "between-the-lens" system is employed and without the use of a slave focus lens moveable in conjunction with the taking lens. It should be realized that although the invention finds its use primarily in low cost cameras, that the system similar to this may be used with SLR type cameras. Many modifications and alterations will occur to those skilled in the art and I do not intend to be limited by the disclosures specifically used in connection with the preferred embodiment. I intend only to be limited by the following claims.

The embodiments of the invention in which an exclusive property or right is claimed are defined as follows:

1. Apparatus for use in a camera having a film plane, a taking lens moveable to a focus position where radiation from a remote object may pass through the taking lens and along an optical path to be focussed on the film plane and an auto focus sensor operable to produce an output indicative of the focus position, comprising:
    shutter means moveable into and out of the optical path;
    reflecting means moveable into and out of the optical path; and
    actuation means operable to move the reflecting means into the optical path to reflect radiation from the remote object to the auto focus sensor when the shutter means is moved out of the optical path and to move the reflecting means out of the optical path when the shutter means is moved into the optical path.

2. Apparatus according to claim 1 including motive means connected to the taking lens and connected to the auto focus sensor to receive the output, the motive means operable in accordance with the output to position the taking lens at the focus position.

3. Apparatus according to claim 2 wherein the positioning of the taking lens at the focus position occurs prior to the moving of the shutter means into the optical path.

4. Apparatus according to claim 3 including moveable means operable in a first position to hold the taking lens at a predetermined position when the reflecting means is in the optical path and in a second position to release the taking lens for positioning by the motive means, in the second position the output of the auto focus sensor operating to stop the motive means when the taking lens has reached the focus position.

5. Apparatus according to claim 4 wherein the operation of the motive means to stop the taking lens at the focus position includes means to move the shutter means into the optical path.

6. Apparatus according to claim 5 wherein the motive means includes bias means urging the taking lens from the predetermined position toward the focus position and includes an actuable member connected to the auto focus sensor to receive the output, and moveable from a first position to a second position upon the occurrence of the output, the moveable member in the first position connected to the shutter means to hold the shutter means out of the optical path and in the second position to contact the taking lens to stop its motion and releasing the shutter means to allow the shutter means to move into the optical path.

7. Apparatus according to claim 6 wherein the shutter means is biased to move into the optical path, the actuable member including a first portion holding the shutter means against the bias and a second portion for engagement with the taking lens to hold the taking lens against the bias means and upon receipt of an output signal the actuable member moves so that the first portion ceases to hold the chutter means against the bias and the second portion engages the taking lens.

8. Apparatus according to claim 1 further including radiation shield means connected to the shutter and to the mirror to prevent radiation from reaching the film plane around the mirror.

9. Apparatus according to claim 1 wherein the shutter means includes a slot and the actuation means includes a pin connected to the reflecting means and slideable in the slot to cause the reflecting means to move with the shutter means.

10. Apparatus for use in a camera having a taking lens, a film plane, shutter means and an auto focus element for receiving radiation from an object and operable to produce an output signal for positioning the taking lens at a desired focus position comprising:
    moveable reflecting means;
    a moveable member, the moveable member operable in a first position to place the shutter means in the optical path between the taking lens and the film plane and in a second position to remove the shutter means from the optical path; and
    means connecting the reflecting means to the moveable member so that when the moveable member is in the first position, the reflecting means is out of the optical path and when the moveable member is in the second position, the reflecting means is in the optical path to reflect radiation from the taking lens to the auto focus element.

11. Apparatus according to claim 10 including motive means connected to the auto focus element to receive the output signal and operable to position the taking lens at the desired focus position.

12. Apparatus according to claim 11 including bias means connected to the moveable member to urge the moveable member towards the first position, connected to the taking lens to urge the taking lens from a predetermined position towards the desired focus position and the motive means includes a moveable member operable in a first position to hold the moveable member against the bias means and release the taking means for motion by the bias means and upon receipt of the output signal to move to a second position wherein the taking lens is held against the bias means and the moveable member is released for motion by the bias means.

13. An auto focus camera comprising:
    a film plane;
    a taking lens for transmitting radiation along an optical path to the film plane;
    first bias means connected to the taking lens to urge the taking lens from a predetermined position towards a focus position where the radiation is focussed on the film plane;
    moveable shutter means;
    second bias means connected to the shutter means to urge the shutter means from a first position out of the optical path towards a second position in the optical path;
    holding means operable in a first position to maintain the shutter means in the first position out of the optical path and in a second position to release the shutter means for motion by the second bias means and simultaneously contact the taking lens to prevent motion of the taking lens by the first bias means;
    moveable reflecting means;
    means connected to the shutter means and to the reflecting means to place the reflecting means in the optical path to reflect radiation in a first path when the shutter means is in the first position and to place the reflecting means out of the optical path when the shutter means is in the second position;
    auto focus means in the first path to receive radiation reflected by the reflecting means when the reflecting means is in the optical path and to produce an output signal when the taking lens is in a proper focus position; and connection means connecting the auto focus means to holding means, the holding means moving from the first position to the second position upon receipt of an output signal.

14. Apparatus according to claim 13 including second holding means connected to be operated by the photographer to move from a first position where the holding means maintains the taking lens in the predetermined position to a second position where the taking lens is released for motion by the first bias means.

* * * * *